United States Patent [19]

Gutteridge

[11] Patent Number: 5,103,279
[45] Date of Patent: Apr. 7, 1992

[54] FIELD EFFECT TRANSISTOR WITH ACCELERATION DEPENDENT GAIN

[75] Inventor: Ronald J. Gutteridge, Paradise Valley, Ariz.

[73] Assignee: Motorola, Inc., Schaumburg, Ill.

[21] Appl. No.: 599,526

[22] Filed: Oct. 18, 1990

[51] Int. Cl.$^5$ .................. H01L 29/66; H01L 29/84; H01L 27/22; H01L 41/04
[52] U.S. Cl. ............................. 357/25; 357/26; 357/27; 310/329
[58] Field of Search ..................... 357/25, 26, 27; 310/329

[56] References Cited

U.S. PATENT DOCUMENTS

| | | | |
|---|---|---|---|
| 3,440,873 | 4/1969 | Eichelberger | 357/25 |
| 3,585,466 | 6/1971 | Davis, Jr. | 357/25 |
| 4,378,510 | 3/1983 | Bennett | 357/26 |
| 4,706,374 | 11/1987 | Murakami | 357/26 |
| 4,873,871 | 10/1989 | Bai et al. | 357/25 |
| 4,963,954 | 10/1990 | Hälg et al. | 357/26 |

FOREIGN PATENT DOCUMENTS 2175744 12/1986 European Pat. Off. .............. 357/25

OTHER PUBLICATIONS

L. M. Roylance, "A Batch-Fabricated Silicon Accelerometer", IEEE Transactions on Electron Devices, vol. ED-26, No. 12; Dec. 1979.

Primary Examiner—Rolf Hille
Assistant Examiner—Wael Fahmy
Attorney, Agent, or Firm—Stuart T. Langley

[57] ABSTRACT

A micro-mechanical sensor having a field effect transistor formed in a proof mass portion of a substrate is provided. The proof mass portion is attached to a support portion of the substrate by a means for flexing such as a diaphragm or cantilever beam. A gate electrode is formed over a channel region of the field effect transistor and separated from the channel region by a gap whereby force applied to the sensor causes the proof mass portion to move towards the gate electrode due to flexing of the flexing means. As the channel region moves closer to the gate electrode, current flows through the field effect transistor generating an output signal.

10 Claims, 4 Drawing Sheets

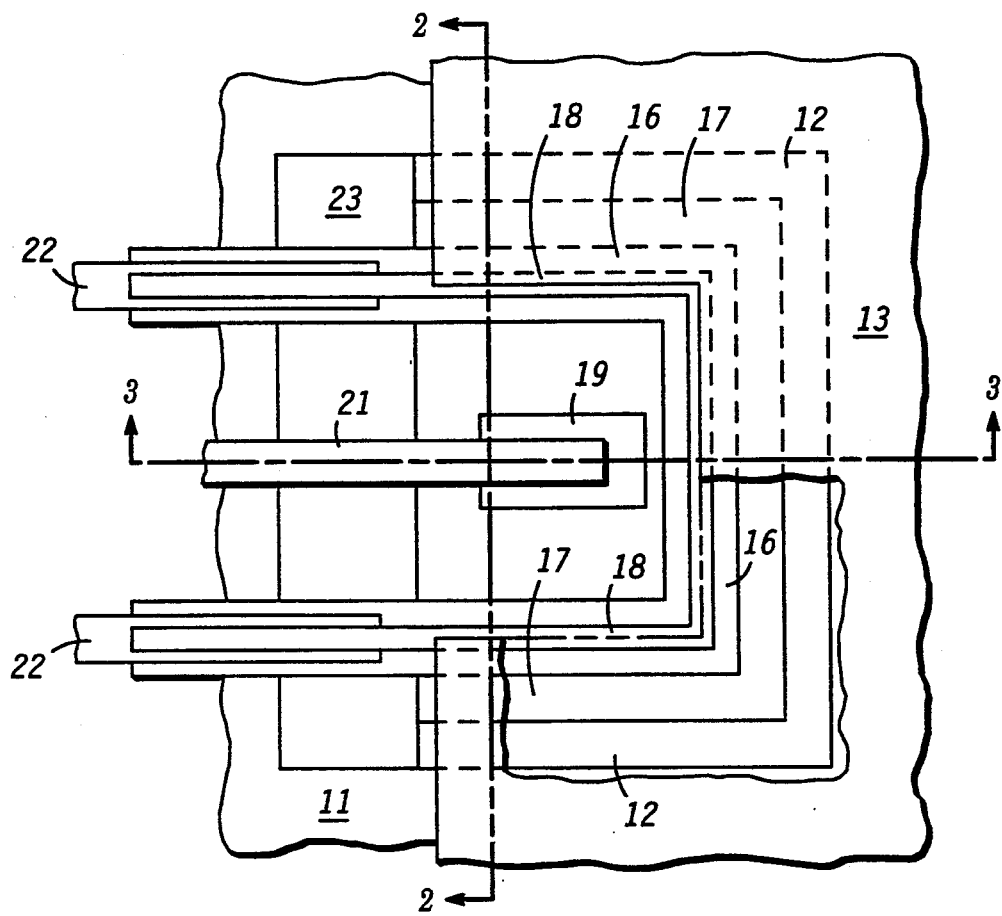
FIG. 1
FIG. 2
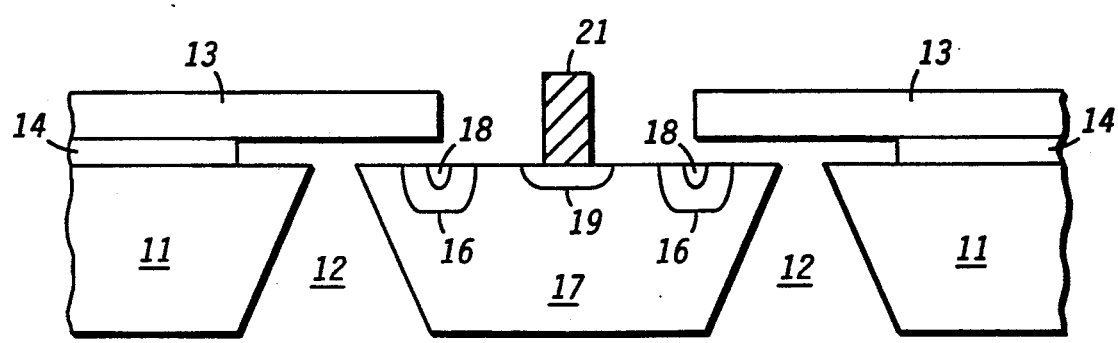

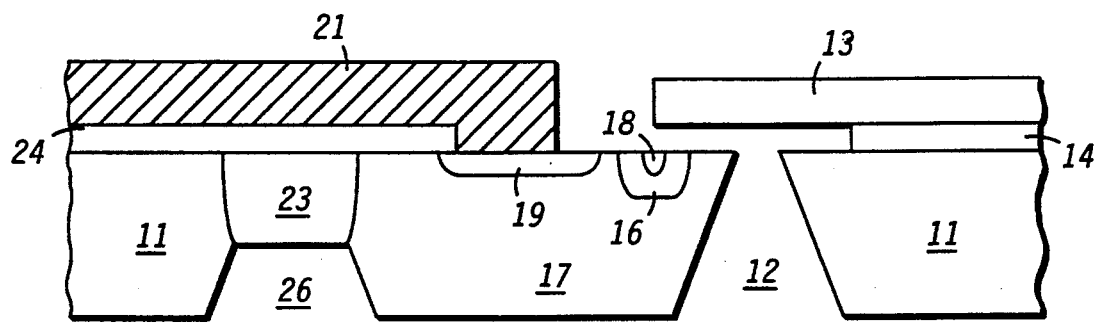
FIG. 3
FIG. 4
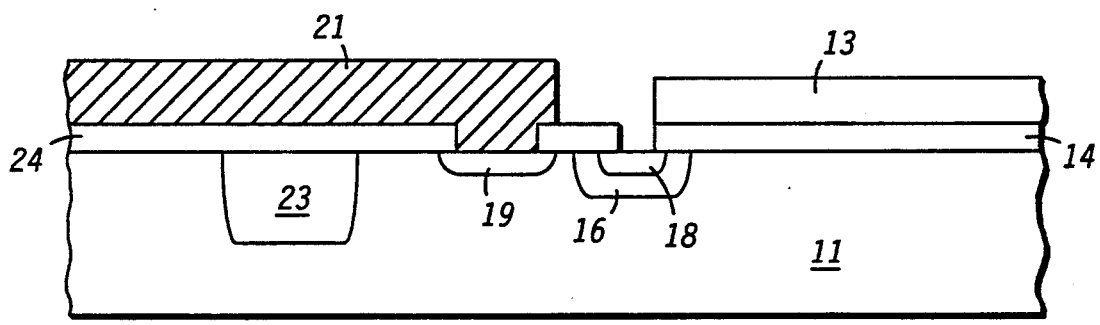
FIG. 5
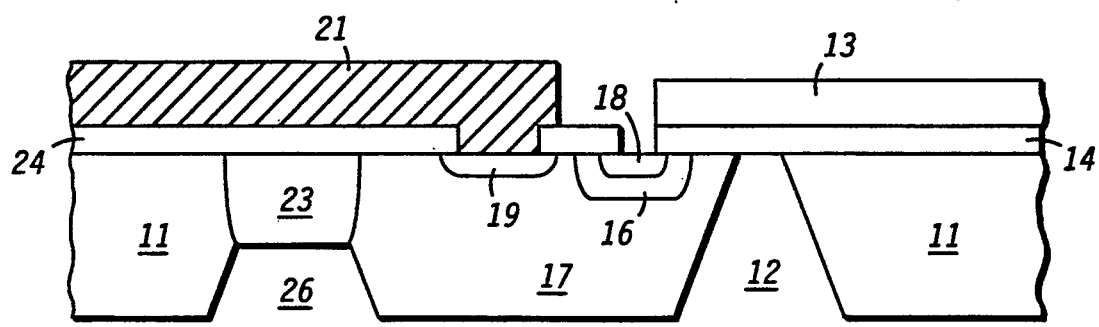

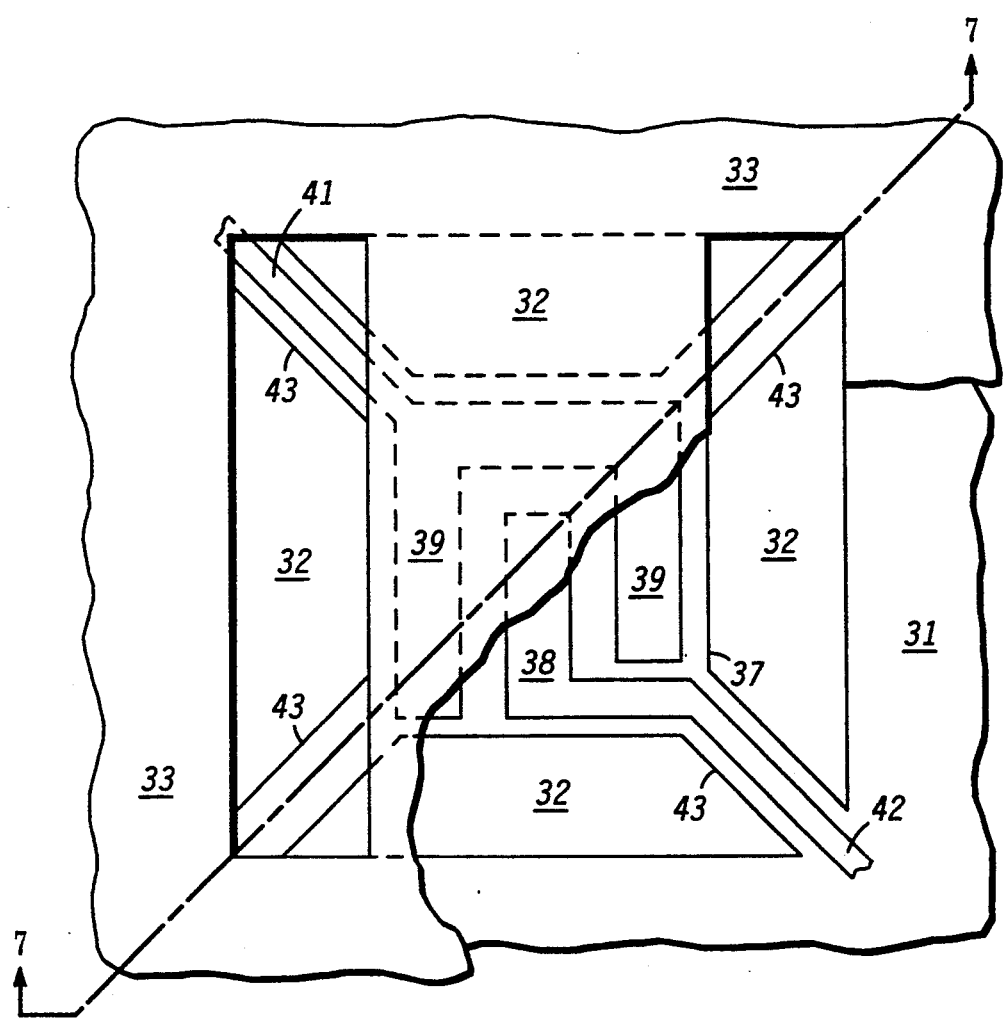
FIG. 6
FIG. 7
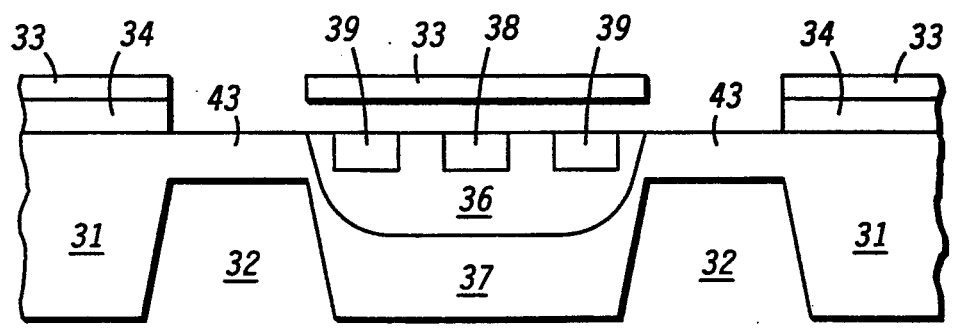

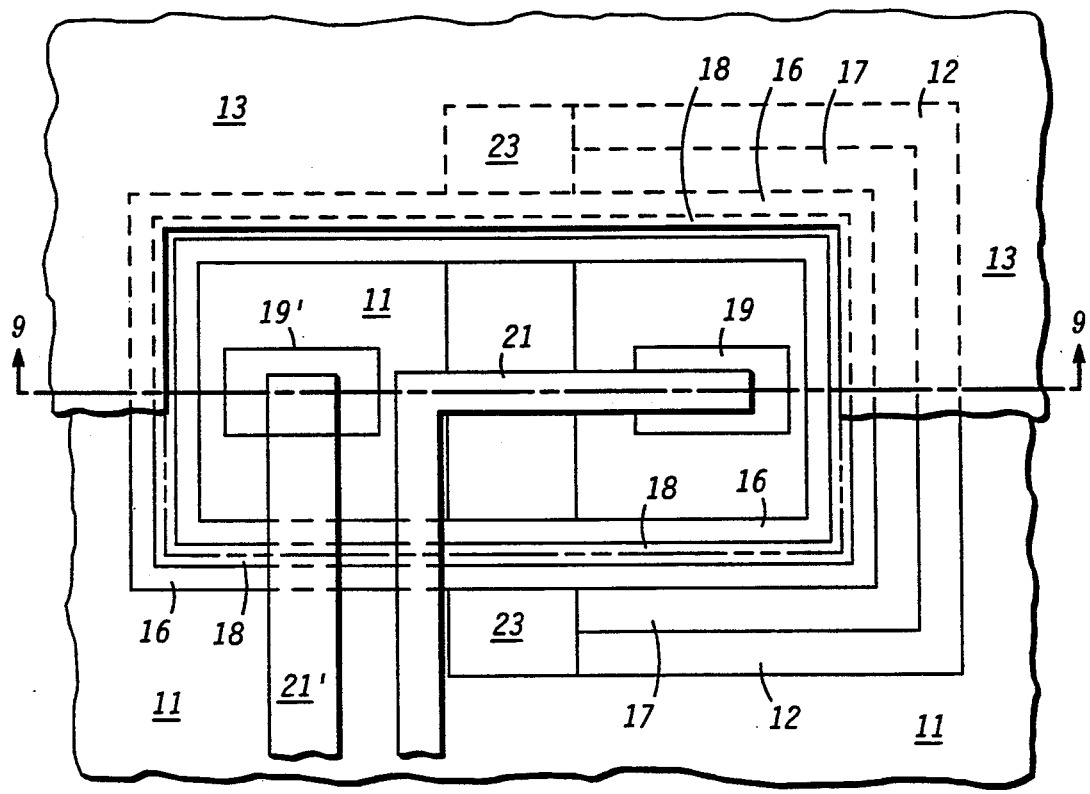
FIG. 8
FIG. 9
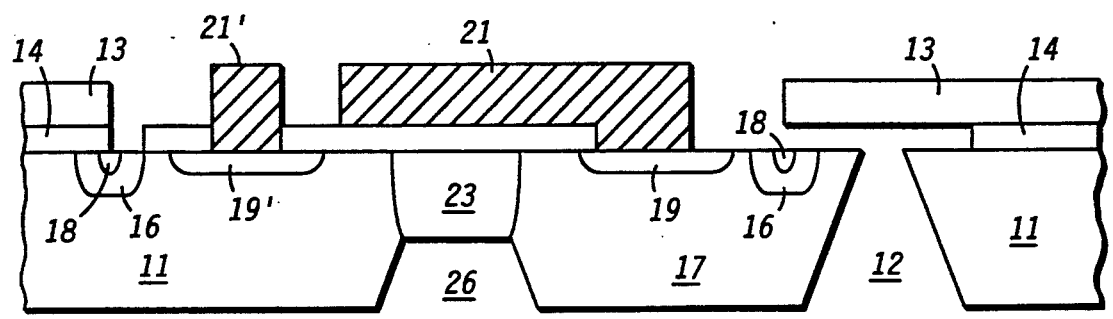

FIELD EFFECT TRANSISTOR WITH ACCELERATION DEPENDENT GAIN

BACKGROUND OF THE INVENTION

This invention relates, in general, to pressure and acceleration sensors, and more specifically, to mechanical sensors using semiconductor material.

In the past, sensors designed for measuring forces due to pressure or acceleration, such as accelerometers, frequently incorporated deflectable diaphragms or cantilever beams. Recently, accelerometers have become available having cantilever beams which swing or oscillate above the channel of a field effect transistor (FET). The moving beam or diaphragm served as a gate of the FET so that current flow through the FET was controlled by mechanical movement of the beam or diaphragm. When such devices were implemented in semiconductor materials the mass of the moving beam or diaphragm was usually quite small and in order to achieve reasonable sensitivity additional weight had to be added to the moving part.

Usually, weight was added by depositing a heavy metal such as gold on to the beam or diaphragm to increase its mass. In the case of accelerometers, the additional mass increased deflection of the diaphragm or cantilever beam which resulted in greater current sensitivity of the FET to acceleration. One difficulty with such devices, however, is that the mass of the gate electrode is relatively small and therefore small deviations in any process which affected the mass of the gate electrode resulted in a large percentage effect on an output signal. Further, the additional materials required to form the weighted gate of the field effect transistor were rarely used in other IC manufacturing processes and so represented increased processing and cost for the accelerometer.

Designs which rely on oscillation of a cantilever beam or diaphragm obviously require a high degree of durability of the diaphragm or beam. In the past, these flexing structures have been manufactured from polysilicon and long term durability of such structures has always been questioned. Furthermore, the physical properties of polycrystalline silicon imposed limitations on size and shape of the flexing devices which were manufactured. These limitations imposed direct limitations on sensitivity and manufacturability of semiconductor accelerometers. It would be desirable to have a semiconductor mechanical sensor having high sensitivity which uses substantially only processes in a conventional MOS manufacturing facility while allowing a great deal of flexibility in design and manufacture of flexible, mechanical elements of the device.

SUMMARY OF THE INVENTION

The objects of the present invention are achieved by a micro-mechanical sensor having a field effect transistor formed in a proof mass portion of a substrate. The proof mass portion is attached to a support portion of the substrate by a means for flexing such as diaphragm or cantilever beam. A gate electrode is formed over a channel region of the field effect transistor and separated from the channel region by a gap whereby acceleration or pressure causes the proof mass portion to move towards the gate electrode due to flexing of the flexing means. As the channel region moves closer to the gate electrode, current will flow through the field effect transistor and generate an output signal.

In a preferred embodiment, a second field effect transistor is provided on the support portion of the substrate wherein the first and second field effect transistors are parametrically matched. The first and second field effect transistors are coupled to form a differential amplifier. Output of the differential amplifier is sensitive to motion of the proof mass with respect to the first gate electrode and the differential amplifier reduces any common mode noise signal caused by temperature, light, or the like.

BRIEF DESCRIPTION OF THE DRAWINGS

FIG. 1 shows a top view of a micro-accelerometer in accordance with the present invention;

FIGS. 2-3 show cross-sectional views of the micro-accelerometer shown in FIG. 1;

FIGS. 4-5 show cross-sectional views of the micro-accelerometer of FIG. 1 at various stages in processing;

FIG. 6 shows a top view of a second embodiment of a micro-accelerometer in accordance with the present invention;

FIG. 7 shows a cross-sectional view of the micro-accelerometer shown in FIG. 6;

FIG. 8 shows a top view of a third embodiment of a micro-accelerometer in accordance with the present invention; and FIG. 9 shows a cross-sectional view of the micro-accelerometer shown in FIG. 8.

DETAILED DESCRIPTION OF THE DRAWINGS

FIG. 1 illustrates a top view of a micro-accelerometer in accordance with the present invention. The micro-accelerometer is formed in a substrate 11 through a combination of MOSFET processing techniques and semiconductor micro-machining techniques. Although the present invention will be described in terms of a lateral diffused metal oxide semiconductor (LDMOS) process, it should be readily apparent that a variety of MOS processing techniques may be used in accordance with the present invention. Also, the present invention will be described in terms of conventional silicon processing but it should be understood that the techniques and structures are equally applicable to compound semiconductor devices. Silicon having a <100> orientation is preferred due to its compatibility with anisotropic etching.

Gate electrode 13 is partially cut away to show underlying structures in FIG. 1. Portions of the underlying structure which are covered by gate electrode 12 in FIG. 1 are illustrated in phantom. Gate electrode 13 would usually comprise a material such as polysilicon, metal, or the like, and covers most of the surface of substrate 11 separated from the surface by a gate oxide which is not visible in the top view shown in FIG. 1. An LDMOS device is formed by providing a channel region or diffusion 16 which is of an opposite conductivity type from substrate 11. A source region 18 is formed inside channel region 16. Both channel region 16 and source region 18 are conveniently formed using gate electrode as a mask which insures channel region 16 is self aligned to gate electrode 13.

For an N-channel LDMOS device substrate 11 comprises N-type silicon, channel region 16 is formed by a P-type diffusion, and source region 18 is formed by a heavily doped N-type diffusion. Preferably, a heavily doped P-type region 23 is formed which extends through source region 18 and channel region 16 at some location. Although not absolutely necessary, the location of P-type region 23 shown in FIG. 1 offers advantages which will become apparent in the discussion of the other figures. Source electrodes 22 are formed in contact with both source region 18 and channel region 16 as is conventional in LDMOS devices.

A micro-machined groove 12 is formed surrounding the LDMOS device on three sides and extends completely through substrate 11. Groove 12 defines a beam portion 17 of substrate 11. Gate electrode 13 extends over groove 12 and over an outer edge of beam portion 17. Source, channel, and drain regions of the LDMOS device also extend onto beam 17. Cross section line 2 represents a cross section shown in FIG. 2 while cross section line 3 indicates a cross section shown in FIG. 3.

FIG. 2 shows cross section 2 shown in FIG. 1 through the width of beam 17. Grooves 12 extend completely through substrate 11 and separate substrate 11 from beam portion 17. Gate oxide 14 and gate electrodes 13 extend over the edges of beam 17. Gate oxide 14 has been etched back from a top surface of beam 17 so that beam 17 is free to move in relation to gate electrodes 13. Channel diffusion 16 and source diffusion 18 are formed using self aligned diffusion processes described hereinbefore. Drain contact 19 comprises a heavily N-type diffusion (for an N-channel device) which may be performed at the same time as the formation of source regions 18. Drain electrode 21 contacts drain contact 19 on a top surface of beam 17. As illustrated, drain electrode 21 extends onto beam 17 and so will affect the motion of beam 17 when force is applied to the accelerometer. It may be desirable to allow drain contact 19 to extend off of beam 17 onto substrate 11 so that drain electrode 21 can be formed on substrate 11 rather than beam 17.

At this point it should be noted that the figures are not drawn to scale and that in a practical device the mass of beam portion 17 would usually be much greater than the mass of gate electrodes 13 and that the extension of gate electrodes 13 beyond gate oxide 14 is comparatively small so that gate electrodes 13 are substantially fixed in position and do not themselves act like a cantilever beam. Although some motion of gate electrode 13 is expected, this motion is significantly less than any motion which occurs in beam 17.

FIG. 3 illustrates cross section 3 shown in FIG. 1 through the length of beam 17. Again it can be seen that beam 17 is separated from substrate 11 by groove 12. What becomes visible in the cross section shown in FIG. 3 is that a partial groove 26 is formed which does not extend through the entire bulk of substrate 11. This is conveniently accomplished by using heavily doped P+ region 23 as an etch stop during a simultaneous etch which forms groove 12 and partial groove 26. Partial groove 26 thus results in a thin portion which allows beam portion 17 to flex when force is exerted against the accelerometer. P+ region 23 in combination with the groove 12 also serves to electrically isolate beam 17 from substrate 11 so that drain contact 19 and drain electrode 21 collect all of the current flowing through the LDMOS device on beam 17 and none of the current flows through substrate 11. The usefulness of this feature will become apparent hereinafter.

FIGS. 4 and 5 illustrate cross-sectional views of the accelerometer shown in FIG. 1-3 at various stages in processing. FIG. 4 shows substrate 11 with diffused regions 23, 19, 16, and 18 which are formed using conventional LDMOS process techniques. Channel region 16 and source region 18 are formed self aligned to gate electrode 13, using gate electrode 13 as a mask. Drain electrode 21, as well as any other top metallization, is patterned to interconnect device elements. Insulating oxide 24 may or may not be the same oxide as gate oxide 14 and may have a different thickness from gate oxide 14.

The structure shown in FIG. 4 is processed through a silicon etch using an etchant such as potassium hydroxide (KOH) or an aqueous solution of ethylenediamine and pyrocatechol (EDP). These etchants are anisotropic in <100> silicon and thus form high aspect ratio groove 12 and partial groove 26. Other anisotropic etch processes are know such as reactive ion etching, but are not commercially feasible at the current state of the art. Groove 12 extends through the substrate 11 to a bottom surface of gate oxide 14 while partial groove 26 extends only to a bottom surface of diffusion 23 where the etch rate drops substantially. The structure is completed by an oxide etch of gate oxide 14 either through groove 12 or from the top surface of the device resulting in the structure shown in FIG. 3.

FIG. 6 illustrates a top view of a second embodiment which is in accordance with the present invention. Gate electrode 33, which covers most of the surface area of the device, is cut away in FIG. 6 to illustrate underlying device elements. Underlying elements in FIG. 6 which are obscured by gate electrode 33 are illustrated in phantom. The embodiment shown in FIG. 6 uses a conventional lateral field effect transistor rather than the self aligned field effect transistor shown in the first embodiment. Source region 38 is formed in a central portion of the device and drain region 39 is formed surrounding source region 38. It should be apparent that more complex interdigitated structures could be formed using the same principles shown in FIG. 6.

Drain interconnect 41 extends away from drain region 39 while a source interconnect 42 extends away from source region 38. A cavity 32 is etched from a back side of substrate 31 so that platform 37 and cantilever supports 43 remain. Platform 37 is a suspended mass which can vibrate or move when force is applied to the accelerometer. Source and drain electrodes (not shown) would be formed on substrate 31 to interconnect the accelerometer to other devices or to form bonding pads to coupled the accelerometer to external devices. Gate electrode 33 is formed on substrate 31 and extends off of substrate 31 over cavity 32 so that it is suspended above source region 38 and drain region 39. When an accelerating force is applied to the accelerometer platform 37 moves with respect to gate electrode 33 thereby changing spacing between gate electrode 33 and a channel formed between source 38 and drain 39.

A cross-sectional view through axis 7 in FIG. 6 is shown in FIG. 7. Using processes similar to that described in the first embodiment, a P-type channel region 36 is formed in N-type substrate 31. Source region 38 and drain region 39 are formed simultaneously with an N-type diffusion. Gate oxide 34 and gate electrode 33 are formed covering a top surface of substrate 31 and covering channel region 36, source region 38, and drain region 39. Gate dielectric 34 is etched out from underneath gate electrode 33 in the region over platform 37. Also, cavities 32 are etched as described in regard to FIG. 6 leaving support beams 43. It is apparent from FIG. 7 that an accelerating force applied to the accelerometer results in a relative position change between the devices formed on platform 37 and gate electrode 33 thereby altering gain of the field effect transistor formed on platform 37. This altered gain is used to detect the accelerating signal. It should also be apparent that rather than using cantilever support beams 43, a continuous diaphragm could be formed surrounding platform 37 while still allowing relative motion between platform 37 and gate electrode 33.

FIG. 9 illustrates a top view of a third embodiment of the present invention illustrating a particular signal processing advantage of the LDMOS device structure in accordance with the present invention. One should immediately note the similarities between the accelerometer structure shown in FIG. 1 and that shown in FIG. 8. The numbered elements shown in FIG. 8 bear the same designation as corresponding elements shown in FIG. 1. Cavity 12, beam 17, channel region 16, source region 18, and drain contact 19 are formed in a similar manner and function in a similar manner to the device as described in reference to FIG. 1.

Channel region 16 and source region 18, however, extend onto substrate 11, creating a second field effect transistor which is parametrically matched to the field effect transistor formed on cantilever beam 17. A second drain contact 19' is formed in substrate 11 and a second drain electrode 21' is coupled to the drain contact. A single gate electrode 13 whose interior boundaries are indicated by dashed line 13 completely surrounds both field effect transistors. A source electrode (not shown) must be formed on the interior portion of the second field effect transistor but need not extend onto beam 17 as a source electrode is a common electrode for both FETs. Drain contact 19' and drain electrode 21' may be formed on the interior portion as shown, or outside the source and channel diffusions by opening a contact hole through gate electrode 13 to reach substrate 11. Particular placement choice for the source electrode and drain electrode 22' will be dependent on device geometry, available manufacturing tools, and device yield.

The first and second field effect transistor shown in FIG. 8 are parametrically matched, differing only in the fact that field effect transistor formed on beam 17 has a gain, and therefore output, which is proportional to acceleration, while field effect transistor formed on substrate 11 is not dependent on acceleration. It is expected that the first and second field effect transistor will be closely matched so that such parasitic parameters such as leakage and threshold voltage which can result in noise in the field effect transistor shown in FIG. 1 will be equal between the first and second field effect transistors. The field effect transistors share a common gate and common source electrodes but have separate, isolated drain electrodes. With the source electrode coupled to ground, and a constant voltage applied to gate electrode 13 the difference in current through drain electrode 22 and drain electrode 22' will be a relatively noise free signal which is a function of acceleration of the micro-accelerometer.

Drain electrode 22 can be coupled through a first resistor to a power supply while drain electrode 22' can be coupled through a second resistor to the same power supply in which case the two field effect transistors are coupled as a conventional MOSFET differential amplifier. This differential amplifier coupling greatly improves signal to noise ratio by increasing common mode rejection and amplifying a different signal.

FIG. 9 shows a cross-sectional view for the micro-accelerometer embodiment shown in FIG. 8. By comparison of FIG. 9 with FIG. 3, it should be apparent that the basic construction of the acceleration sensitive FET is unchanged from the embodiment shown in FIG. 3. In addition to the structure shown in FIG. 3, however, a second drain contact 19' and drain electrode 21' are formed coupled to substrate 11 and electrically isolated from beam 17. Channel region 16 and source region 18 extend to substrate 11 and are formed by the self aligned process described in reference to FIGS. 1 and 2. Beam portion 17 is free to move in relation to gate electrode 13 when an accelerating field is applied to the micro-accelerometer.

Another useful deviation from the structure shown in FIG. 9 would be to remove gate oxide from between the channel region of the second FET and gate electrode 13 at the same process step where gate oxide 14 is etched back on the acceleration dependent FET. This modification allows gate electrode 13 to vibrate equally with respect to each of the channels of the first and second FETs resulting in a common mode noise signal which can be rejected by a differential amplifier coupling. This arrangement would further improve device matching and would compensate to a large extent for any motion of electrode 13 during an accelerating force.

By now it should be appreciated that an improved micro-accelerometer has been provided wherein the source and drain are formed on a proof mass beam or platform which can move with relation to a substantially fixed gate electrode. Much greater sensitivity is achieved by the large proof mass which can be provided using the method of the present invention and greater compatibility with conventional MOS technology is provided as no additional processing steps are necessary to increase mass of the gate electrode. Further, since a flexing portion of the structure is formed in single crystal silicon, greater durability and linear flexing is provided. As a result of the relatively uncomplicated structure and high compatibility with MOSFET technology, a second, non-acceleration dependent field effect transistor can be fabricated simultaneously with the acceleration dependent field effect transistor and the first and second transistor coupled to form a differential amplifier with improved signal to noise ratio and high rejection of common mode noise signals.

What is claimed:

1. A mechanical sensor comprising:
   a semiconductor substrate, wherein the substrate further comprises a support portion, a proof mass portion, and a means for flexing which couples the proof mass portion to the support portion;
   a first field effect transistor, wherein the first field effect transistor further comprises a source and a drain formed in the proof mass portion;
   a channel formed in the proof mass portion between the source and drain; and
   a gate electrode formed over the channel in the proof mass portion and separated from the channel by a gap, wherein mass of the gate electrode is less than mass of the proof mass portion.

2. The mechanical sensor of claim 1 wherein the means for flexing comprises single crystal silicon.

3. The mechanical sensor of claim 1 further comprising an oxide layer covering the channel.

4. The mechanical sensor of claim 1 wherein the means for flexing comprises a beam.

5. The mechanical sensor of claim 1 wherein the means for flexing comprises a diaphragm.

6. The mechanical sensor of claim 1 further comprising:
- a second field effect transistor, wherein the second field effect transistor further comprises a source and a drain formed in the support portion;
- a channel formed in the support portion between the source and drain; and
- a gate electrode formed over the channel in the support portion, wherein the second field effect transistor is parametrically matched to the first field effect transistor and is coupled to the first field effect transistor to form a differential pair.

7. The mechanical sensor of claim 6 wherein the gate of the second FET is separated from channel of second FET by an oxide layer which holds the gate electrode of the second FET in a fixed relationship with respect to the channel of the second field effect transistor.

8. The mechanical sensor of claim 6 wherein the gate of the second FET is separated from the channel of the second FET by a gap which allows the gate electrode to swing with respect to the channel of the second FET.

9. The mechanical sensor of claim 1 wherein the gate electrode comprises polysilicon.

10. The mechanical sensor of claim 1 further comprising:
- a first diffused interconnect formed in the substrate extending from the source of the first FET across the means for flexing to the support portion;
- a second diffused interconnect formed in the substrate extending from the drain of the first FET across the means for flexing to the support portion;
- a source electrode coupled to the first diffused interconnect; and
- a drain electrode coupled to the second diffused interconnect.

* * * * *